3,072,622
HARD RESILIENT COPOLYMERS OF ALPHA-AL-KYLSTYRENE WITH ALKYL METHACRYLATE AND PROCESS FOR THE PREPARATION THEREOF
George E. Ham, Kansas City, Mo., assignor to J. T. Baker Chemical Company, Phillipsburg, N.J., a corporation of New Jersey
No Drawing. Filed Mar. 6, 1959, Ser. No. 797,597
10 Claims. (Cl. 260—86.7)

This invention relates to polymerization products of α-alkylstyrenes with certain alkyl methacrylates.

This application is a continuation-in-part of my application Serial No. 694,910 and my application Serial No. 584,481, which is in turn a continuation-in-part of application Serial No. 560,860, all said applications being now abandoned.

Homopolymers of methyl acrylate are soft, pliable, adhesive and have no substantial heat resistance. Moldings made from these polymers have poor mar resistance and are easily scratched. Because of these properties, they are not useful molding compounds. Previous attempts to improve scratch or mar resistance by the use of cross-linking agents have resulted in increased brittleness and other undesirable properties. These products have also been difficult to fabricate either by compression or injection molding.

Homopolymers of methyl methacrylate are much superior for molding purposes, being water white, clear and transparent, have good mechanical stability, are stable to light and have excellent weathering characteristics. However, they have a low heat-distortion value and cannot be used for many important applications such as optical lenses, electric fixtures, light shades, electrical appliances and in other situations where high temperatures are apt to develop.

Surprisingly, I have found that copolymers of α-alkylstyrenes with alkyl methacrylates prepared in the proportions and in accordance with the procedures described hereinbelow are far superior products, having better heat resistance and appreciably higher softening points than any of the homopolymers of the alkyl acrylates or alkyl methacrylates.

While my new copolymers retain the desirable properties of the homopolymers of methyl methacrylate such as water-white transparency, mechanical stability, stability to light and excellent weathering characteristics and the desirable properties of the homopolymers of α-methylstyrene such as hardness, resiliency, good mar resistance and scratch resistance, they do not have the undesirable properties of homopolymers of methyl acrylate such as softness and adhesiveness, the instability to light and heat of the α-methylstyrene polymers and the relatively low heat resistance of the methyl methacrylate polymers.

The new copolymers of the present invention have appreciably higher softening points than homopolymers of methyl or ethyl acrylate. Thus, they have improved resistance to deformation at elevated temperatures. The copolymers are clear, colorless and hard and have good impact strength. They are appreciably harder than methyl acrylate homopolymers. Surprisingly, even though they are hard, the compositions possess excellent resilience and are not brittle. Thus, they have good mar resistance, a particularly desirable property. Few materials show the property of improved resilience with increasing hardness. The copolymers do not have the undesirable property of "elastic memory" possessed by the homologous acrylates.

The copolymers are useful, for example, for the production of plastic articles by extruding, molding and casting. Sheets, rods, tubes, lenses and massive pieces may be formed. The copolymers are generally useful for the same purposes as, and can be made into useful articles in a manner similar to, the well-known polymethyl methacrylate.

Certain copolymers as discussed below of α-methylstyrene and methyl methacrylate have been disclosed; but the disclosed polymers at best possessed very low molecular weights and undesirable properties such as brittleness and poor heat resistance. They have no utility as plastics.

Smets and De Haes in Bulletin Soc. Chim. Belges 59, 13–33 (1950) (C.A. 44, 7089e), in a theoretical study of polymerization reaction rates reported copolymers from α-methylstyrene and methyl methacrylate in molar proportions of 1:4 and 4:1. The copolymers, however, were of such low molecular weight that they possessed no desirable properties of strength, toughness and heat or mar resistance. The footnote on page 24 of the article states that the molecular weight obtained was too low to effect osmotic measurement and too high for cryoscopic measurement. It is probable that these copolymers have molecular weights not exceeding about 5000 to 10,000. In addition, it is well known in the art that solutions of such copolymers would be indistinguishable from pure solvent by viscosity measurement. Such a copolymer would have no useful properties and no utility as a plastic.

Walling et al. in the Journal of the American Chemical Society 70, p. 1543 (1948), mention copolymers from α-methylstyrene and methyl methacrylate in molar proportions of 1:4 and 4:1 (see page 4 of the experimental data in Document 2497 referred to in footnote [3] of the article). The copolymers, however, possessed low viscosities and hence low molecular weights. In a duplication of the experiment relating to the 1:4 copolymerization of the article, a copolymer was obtained with an intrinsic viscosity as measured in dioxane at 25° C. of only 0.18. This corresponds to a very low molecular weight of not more than about 20,000. The copolymer was brittle and had poor heat resistance. It had no utility as a plastic. The copolymer of the article would be of even lower intrinsic viscosity as a significantly lower degree of conversion was obtained and would be of no utility as a plastic.

I have found, however, contrary to the teachings of the prior art discussed above, that certain copolymers of α-methylstyrene and methyl methacrylate which have a low intrinsic viscosity are of no value as plastics, that copolymers of α-methylstyrene and methyl methacrylate having an intrinsic viscosity as measured in dioxane at 25° C. of at least about 0.25 possess a particularly advantageous and surprising combination of properties which make them particularly useful as plastics for the production of articles by molding, casting or extrusion. The intrinsic viscosity must be at least about 0.25 to obtain products of useful properties. I have examined copolymers of the composition described above having an intrinsic viscosity of 0.25 as measured in dioxane at 25° C. and found them to be useful as plastics. I have examined copolymers of the composition described above having an intrinsic viscosity of 0.18 as measured in dioxane at 25° C. and found them not to be useful as plastics. Thus, I regard my invention as encompassing copolymers of an intrinsic viscosity of about 0.25 and higher. It is not practical to give an upper limit to the intrinsic viscosity value as useful products can be made from polymers having very high intrinsic viscosities.

The phenomenon of increased softening point and increased hardness is generally characteristic of copolymers of α-alkylstyrenes and alkyl methacrylates as described below.

The useful α-alkylstyrenes include those in which the alkyl group contains not more than six carbon atoms, i.e. styrene substituted in the alpha position with a methyl, ethyl, propyl, butyl, amyl or hexyl group. Straight or branched chain groups are useful. The compounds have the formula

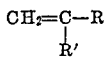

wherein R' is a phenyl radical and R is an alkyl group of one to six carbon atoms. These compounds can be prepared, for example, by the catalytic dehydrogenation of the corresponding isoalkylbenzene in the presence of steam or by the dehydration of the corresponding carbinol by the use of a dehydrating agent such as sodium bisulfate, oxalic acid or anhydrous potassium hydroxide. The carbinols can be prepared by reaction of methyl magnesium bromide with an alkylphenyl ketone or by reaction of acetophenone with an alkyl magnesium bromide.

The useful alkyl methacrylates include those in which the alkyl group contains not more than four carbon atoms, e.g., methyl, ethyl, n-propyl, isopropyl, n-butyl, isobutyl, t-butyl, and sec-butyl methacrylates.

When preparing copolymers of α-alkylstyrenes with alkyl methacrylates, I may mix together 5 to 45 parts by weight of an α-alkylstyrene with 45 to 95 parts by weight of an alkyl methacrylate and polymerize the mass as described below. Preferably I copolymerize 15 to 40 parts by weight of the α-alkylstyrene with 60 to 85 parts by weight of an alkyl methacrylate.

It is preferred that the polymerization take place within the range of 70 to 160° C. for varying periods of time in the presence of a polymerization catalyst. Catalysts suitable for preparing the copolymers are free radical producing catalysts, for example, organic peroxides, persulfates, oxonides, metal alkyls, diazonium salts, diazotates, hydrazines and amine oxides. Among the organic peroxides, benzoyl peroxide, tertiary-butyl hydroperoxide and ditertiary-butyl peroxide are particularly useful. Others are known to those skilled in the art and may be used. The catalyst is used in a concentration of about 0.01 to 0.8 percent by weight based on the total monomers.

In general, it is desirable to convert the monomers charged as completely as possible to the copolymer. Under these circumstances, the overall composition of the copolymer obtained will be substantially similar to that of the mixture of monomers charged. At lower conversions, however, the composition of the copolymer can differ significantly from that of the mixture of monomers charged. This will depend upon the degree of conversion, the reactiveness of the individual monomers and the ratio of the monomers in the charge. These factors are easily determinable by simple experimentation.

Should any unreacted monomer remain in the polymerization product, it can be solvent extracted.

While the reaction can be carried out in a single heating at a substantially constant temperature, preferably the reaction is carried out by increasing the temperature in increments; i.e., in a heating cycle involving a gradual elevation of temperature. The use of the cycle is advantageous in that lower catalyst concentrations can be used, increased conversions are obtained, polymerization time is reduced, bubble formation is reduced, and a more uniform product is obtained.

The polymerization process described above and the products that are obtained are each further improved by carrying out the polymerization in the presence of an organic disulfide of the formula R—S—S—R', wherein R and R' are alkyl or aryl radicals. The useful alkyl radicals include methyl, ethyl, propyl, isopropyl, butyl, isobutyl, tertiary butyl, amyl, hexyl, octyl and lauryl. The useful aryl radicals include phenyl, tolyl, parachlorophenyl, napthyl and benzyl. The organic disulfide is used in amounts ranging from 0.01 part by weight of the reaction mixture to as much as 2 parts by weight or percent by weight. The use of these disulfides is described in more particular in the copending application Serial No. 683,221 of Hornbaker et al., filed September 11, 1957, now abandoned. These disulfides not only tend to stabilize the final products to thermal degradation but also are regulators of the polymerization process. Mercaptans such as tertiary dodecyl mercaptan which are believed to oxidize during the polymerization to corresponding disulfides having the formula above may also be used as stabilizers in lieu of the disulfides.

Although my invention is predicated primarily upon the unusual properties of the copolymers of α-alkylstyrenes and alkyl methacrylates, it will be understood that small amounts of modifying materials such as dyes, pigments, lubricants, plasticizers and the like may be added as desired by those skilled in the art. Also, small amounts of other polymerizable materials such as acrylonitrile, methacrylonitrile, fumaronitrile, styrene, acrylic esters and the like may be added to impart modified properties to the copolymers so long as the essential proportions of the α-alkylstyrene to the alkyl methacrylate are maintained essentially as discussed hereinabove.

The products of my invention will be further illustrated by the following examples.

By the term "intrinsic viscosity" as used herein, I mean the value [η] obtained by the experimental determination of specific viscosity $\eta_{sp}$ and calculated from the following equation $$[\eta] = \left[\frac{\eta_{sp}}{C}\right] C \longrightarrow 0$$

where C is concentration in grams of polymer per 100 milliliters of solution. See also page 30 of Vinyl and Related Polymers by C. E. Schildknecht, John Wiley and Sons, Inc., New York, 1952.

EXAMPLE I

Copolymers of α-methylstyrene and methyl methacrylate of varying proportions were prepared by mass polymerization procedures. The results are tabulated in Table I below.

Method A of Table I will be illustrated by run 4 in which a solution containing 8 grams of methyl methacrylate, 2 grams of α-methylstyrene and 0.005 gram (0.05%) of ditertiary butyl peroxide sealed in 9 cm. diameter tube previously flushed with nitrogen was heated in an oven for sixteen hours at 100°, forty-nine hours at 120°, seventy-two hours at 140° and four hours at 160°. A colorless, hard, transparent polymer was obtained when the cooled tube was broken. It was crushed, dissolved in dioxane and precipitated by addition of methanol. The products had an alcohol-soluble content of 7.6 percent.

Method B of Table I will be illustrated by run 5 in which a solution containing 30 grams of methyl methacrylate, 10 grams of α-methylstyrene and 0.02 gram of benzoyl peroxide (0.05 percent) under a nitrogen atmosphere in a 100-milliliter screw-capped bottle with an aluminum foil gasket was heated in an oven for 96 hours at 90° C., 48 hours at 110° C., 48 hours at 140° C. and 24 hours at 160° C. The colorless, hard, transparent polymer obtained was crushed, dissolved in 500 milliliters of dioxane and precipitated by adding the solution to 1500 milliliters of stirred methanol. Filtration and drying gave 36 grams (90 percent) of white powder.

Method C was similar to method B except the heating cycle was 113 hours at 90° C., 24 hours at 120° C. and six hours at 160° C. Method D was similar to method B except that the heating cycle was 18 hours at 100° C., 49 hours at 120° C., 118 hours at 140° C. and eight hours at 160° C.

Table I

| Run No. | Method | Alpha-methylstyrene | | Conversion, percent | Softening point [2], °C. | $[\eta]$ [3] |
|---|---|---|---|---|---|---|
| | | In monomer, percent [1] | In polymer, percent [1] | | | |
| ([4]) | | 0 | 0 | 96 | 142 | |
| ([5]) | | 0 | 0 | | 142 | |
| 1 | A | 10 | 11 | 94 | 152 | 1.24 |
| 2 | B | 15 | 14.3 | 93 | 154 | 1.76 |
| 3 | B | 20 | 18.3 | 89 | 158 | 1.68 |
| 4 | A | 20 | | 92 | 157 | 1.18 |
| 5 | B | 25 | 22.6 | 90 | 160 | 1.38 |
| 6 | C | 25 | | | 159 | 1.26 |
| 7 | B | 30 | 26.4 | 86 | 161 | 1.09 |
| 8 | A | 30 | | 89 | 160 | 0.62 |
| 9 | B | 35 | 32 | 80 | 162 | 0.71 |
| 10 | A | 40 | 33.9 | 79 | 162 | 0.49 |
| 11 | D | 50 | 40 | 54 | 162 | 0.30 |
| 12 | A | 50 | | 62.6 | 154 | 0.25 |

[1] Balance is methyl methacrylate.
[2] Determined on a Parr melting point bar; i.e., by sprinkling the powdered polymer on a heated block and noting the temperature at which the material tends to adhere to the block.
[3] The intrinsic viscosity, determined in dioxane at 25° C.
[4] Methyl methacrylate polymer prepared using Method A.
[5] Plexiglas V-100, a commercially available methyl methacrylate polymer.

It is clear from the results that the copolymers had good heat resistance as indicated by the high softening point. They had a high intrinsic viscosity indicating high molecular weight. In particular, the softening point of the copolymers was well above that of the prepared and commercially available methyl methacrylate polymer.

EXAMPLE II

Copolymers prepared as described in Example I above were molded at 150° C. for one hour under a pressure of 15,000 p.s.i. and the products evaluated. The results are tabulated in Table II below. The products are identified in the table by reference to the run numbers of the copolymers of Table I from which copolymers the products were prepared.

Table II

| Run No. | Color | Density, grams/cc. | Rockwell hardness [1] | Permanent deformation [2] | Distortion temperature, °C.[3] |
|---|---|---|---|---|---|
| ([4]) | Water white | 1.19 | M-91 | Yes | <80 |
| ([5]) | do | 1.20 | M-92 | Yes | 100-115 |
| ([6]) | do | 1.06 | M-81 | Yes | 110-115 |
| 1 | do | 1.185 | M-109 | No | 115-120 |
| 4 | do | 1.177 | M-112 | No | 120-125 |
| 6 | do | | | | 140-150 |
| 7 | do | | | | 140-150 |
| 8 | do | 1.162 | M-107 | No | 130-135 |
| 10 | do | 1.157 | M-111 | No | 140-145 |
| 11 | do | | | | 140-145 |
| 12 | do | | | | 115-125 |

[1] A.S.T.M. D785-51A procedure.
[2] Permanent deformation was measured by examination of the surface of the specimen where the Rockwell hardness test was run. The copolymers showed no indentation after 24 hours. The methyl methacrylate polymers and the polystyrene showed indentations after at least 1 week.
[3] The values were obtained by exposing ¼" x 1½" diameter molded discs at the test temperature for 5 minutes. The temperature at which the sharp edges started to distort was recorded.
[4] Methyl methacrylate polymer prepred by Method A of Table I.
[5] Plexiglas V-100, a commercially available polymethyl methacrylate.
[6] Styron 700, a commercially available polystyrene.

The results clearly indicate the advantageous and surprising properties of increased hardness, resilience and heat resistance of the copolymers. The products are initially harder than the prepared or commercially available methyl methacrylate polymer and the comercially available polystyrene. Surprisingly, however, the copolymers possessed excellent resilience as shown by the permanent deformation tests. Thus, while the prepared or commercially available methyl methacrylate polymer and the commercially available polystyrene and indentations made by the Rockwell hardness testing lead at least one week after the test, the copolymers showed no signs of indentation after only twenty-four hours. This surprising property of the copolymers is particularly advantageous in the production of molded articles having good mar resistance.

EXAMPLE III

By a procedure similar to that of Example I using 0.1 percent by weight of benzoyl peroxide as catalyst and heating at 90° C. for five days, various copolymers of alkyl methacrylates and α-methylstyrene were prepared.

The results are tabulated below:

Table III

| Run No. | Alkyl methacrylate | Alpha-methylstyrene, percent | | Softening point, °C. | | $[\eta]$ [4] |
|---|---|---|---|---|---|---|
| | | Monomer [1] | Polymer [1] | Copolymer [2] | Homopolymer [3] | |
| 16 | Ethyl | 25 | 20.14 | 140.5 | 81 | 0.72 |
| 17 | n-Propyl | 25 | 21.8 | 128 | 55 | 0.48 |
| 18 | i-Propyl | 25 | 21.4 | 151.5 | 88 | 0.68 |
| 19 | n-Butyl | 25 | 19.6 | 101 | 30 | 0.82 |

[1] Balance is alkyl methacrylate.
[2] Determined on a Parr melting point bar; i.e., by sprinkling the powdered polymer on a heated block and noting the temperature at which the material tends to adhere to the block.
[3] Reported values (Vicat).
[4] Intrinsic viscosity, determined in dioxane at 25° C.

The increased softening point of the alkyl methacrylate-α-methylstyrene copolymers are clearly illustrated by comparing with the reported values for the corresponding alkyl methacrylate homopolymer.

EXAMPLE IV

Copolymers prepared as in Example III were molded into 1⅛ inch discs and the products evaluated. The products are identified in the table by reference to the run numbers of the copolymers of the preceding tables from which copolymers the products were prepared.

Table IV

| Run No. | Copolymer or homopolymer | Rockwell hardness [1] | Resistance to penetration [2] | Disc distortion temperature, °C.[3] | Tg. °C.[4] |
|---|---|---|---|---|---|
| | Polymethyl MA [5] | M-92 | 72 | 102.5 | 105 |
| | Methyl MA/α-MS [6] | M-107.5 | 100 | 145 | |
| | Polyethyl MA | [7] M-65 | | | 47 |
| 16 | Ethyl MA/α-MS | M-82 | 57 | 110 | |
| | Poly n-propyl MA | [7] M-40 | | | 33 |
| 17 | n-Propyl MA/α-MS | M-72 | 37 | 110 | |
| 18 | Isopropyl MA/α-MS | M-96 | 74 | 120 | |
| | Poly n-butyl MA | [7] 0 | | | 17 |
| 19 | n-Butyl MA/α-MS | M-35 | 28 | 150 | |

[1] A.S.T.M. D785-51A procedure.
[2] The value obtained by measuring the depth of penetration on application of the load in procedure 1.
[3] The values were obtained by exposing ¼" x 1⅛" diameter molded disks at the test temperature for 5 minutes. The temperature at which the sharp edges started to distort was recorded.
[4] Second-order transition temperature.
[5] Plexiglas V-100, a commercially available polymethyl methacrylate.
[6] 75 percent methyl methacrylate/25 percent α-methylstyrene.
[7] Approximate values.

The results clearly indicate the advantageous and surprising properties of increased hardness, resilience and heat resistance of the copolymers.

The increased softening point or heat resistance of the copolymers is more strikingly illustrated by comparison of the heat distortion temperature of the copolymers with the second-order transition temperature (Tg) of the homopolymers. This value is the temperature at which the polymer becomes a rubbery solid and is roughly comparable to a heat distortion temperature.

The products are significantly harder than the corresponding alkyl methacrylate homopolymer since these homopolymers are soft, almost rubbery, products with very low Rockwell hardness values even approaching zero. Moreover, even though they are hard, the products are surprisingly resilient as indicated by the high Rockwell hardness values.

I claim:

1. A method of preparing copolymers of alpha-alkylstyrenes and alkyl methacrylates characterized by having an intrinsic viscosity of at least 0.25 when measured in dioxane at 25° C., being resistant to deformation at high temperatures having a softening point of at least 152° C. and a disc distortion temperature of at least 120° C., said copolymers being hard, resilient, mechanically stable, colorless, clear and having water-white transparency, which comprises heating a mixture comprising 10 to 40 parts by weight of a monomeric alpha-alkylstyrene in which the alkyl group contains from 1 to 6 carbon atoms and 60 to 90 parts by weight of a monomeric alkyl methacrylate in which the alkyl group contains from 1 to 4 carbon atoms and 0.01 to 0.8 percent by weight thereof of a free-radical producing polymerization catalyst at temperatures within the range 90°–160° C., the polymerization being carried out by gradually elevating the temperature from 90° C., the time of heating within the range 90°–100° C. being from 16 to 113 hours, 24 to 49 hours within the range 110°–120° C. and not more than 24 hours at 160° C.

2. A method of preparing copolymers of alpha-methylstyrene and methyl methacrylate characterized by having an intrinsic viscosity of at least 0.25 when measured in dioxane at 25° C., being resistant to deformation at high temperatures having a softening point of at least 152° C. and a disc distortion temperature of at least 120° C., said copolymers being hard, resilient, mechanically stable, colorless, clear and having water-white transparency, which comprises heating a mixture comprising 10 to 40 parts by weight of a monomeric alpha-methyl styrene and 60 to 90 parts by weight of a monomeric methyl methacrylate and 0.01 to 0.8 percent by weight thereof of a free-radical producing polymerization catalyst at temperatures within the range 90°–160° C., the polymerization being carried out by gradually elevating the temperature from 90° C., the time of heating within the range 90°–100° C. being from 16 to 113 hours, 24 to 49 hours within the range 110°–120° C. and not more than 24 hours at 160° C.

3. A method in accordance with claim 1 in which the catalyst is an organic peroxide.

4. A method in accordance with claim 2 in which the catalyst is a benzoyl peroxide.

5. A method in accordance with claim 2 in which the catalyst is ditertiary butyl peroxide.

6. A method in accordance with claim 2 in which the polymerization mixture contains from 0.01 to 2 percent by weight of an organic disulfide as a polymerization regulator.

7. A method in accordance with claim 2 in which the polymerization mixture contains from 0.01 to 2 percent by weight of tertiary dodecyl mercaptan.

8. A copolymer of a mixture consisting essentially of 10 to 40 parts by weight of an alpha-alkylstyrene in which the alkyl group has one to six carbon atoms, and 60 to 90 parts by weight of an alkyl methacrylate in which the alkyl group has one to four carbon atoms, said copolymer having an intrinsic viscosity when measured in dioxane at 25° C. of at least 0.25, being resistant to deformation at high temperatures having a softening point of at least 152° C. and a disc distortion temperature of at least 120° C., said copolymer being hard, resilient, mechanically stable, colorless, clear and having water-white transparency when prepared by the method of claim 1.

9. A copolymer of a mixture consisting essentially of 10 to 40 parts by weight of alpha-methylstyrene and 60 to 90 parts by weight of methyl methacrylate, said copolymer having an intrinsic viscosity when measured in dioxane at 25° C. of at least 0.25, being resistant to deformation at high temperature having a softening point of at least 152° C. and a disc distortion temperature of at least 120° C., said copolymer being hard, resilient, mechanically stable, colorless, clear and having water-white transparency when prepared by the method of claim 2.

10. A copolymer of a mixture consisting essentially of 15 to 40 parts by weight of alpha-methylstyrene and 60 to 85 parts by weight of methyl methacrylate, said copolymer having an intrinsic viscosity when measured in dioxane at 25° C. of at least 0.25, being resistant to deformation at high temperatures having a softening point of at least 152° C. and a disc distortion temperature of at least 120° C., said copolymer being hard, resilient, mechanically stable, colorless, clear and having water-white transparency when prepared by the method of claim 2.

References Cited in the file of this patent

UNITED STATES PATENTS

| | | |
|---|---|---|
| 2,579,908 | Davison et al. | Dec. 25, 1951 |
| 2,617,788 | Schaffel et al. | Nov. 11, 1952 |
| 2,647,111 | Shusman | July 28, 1953 |
| 2,701,242 | Erchak et al. | Feb. 1, 1955 |
| 2,769,804 | Hanson | Nov. 6, 1956 |
| 2,784,136 | Dierick et al. | Mar. 5, 1957 |
| 2,851,447 | Wesp et al. | Sept. 9, 1958 |

OTHER REFERENCES

Smets et al.: Bull. Soc. Chim. Belges 59, 13–33 (1950).
Walling et al.: J. Am. Chem. Soc. 70, 1543–4 (1958).